(12) United States Patent
Jabado et al.

(10) Patent No.: US 7,744,351 B2
(45) Date of Patent: Jun. 29, 2010

(54) MATERIAL COMPOSITION FOR PRODUCING A COATING FOR A COMPONENT MADE FROM A METALLIC BASE MATERIAL, AND COATED METALLIC COMPONENT

(75) Inventors: Rene Jabado, Berlin (DE); Ursus Krüger, Berlin (DE); Daniel Körtvelyessy, Berlin (DE); Ralph Reiche, Berlin (DE); Michael Rindler, Schöneiche (DE); Jan Steinbach, Berlin (DE); Raymond Ullrich, Schönwalde (DE)

(73) Assignee: Siemens Aktiengesellschaft, Munich (DE)

( * ) Notice: Subject to any disclaimer, the term of this patent is extended or adjusted under 35 U.S.C. 154(b) by 448 days.

(21) Appl. No.: 11/664,742

(22) PCT Filed: Aug. 31, 2005

(86) PCT No.: PCT/EP2005/054277

§ 371 (c)(1),
(2), (4) Date: Apr. 5, 2007

(87) PCT Pub. No.: WO2006/037702

PCT Pub. Date: Apr. 13, 2006

(65) Prior Publication Data

US 2007/0289490 A1    Dec. 20, 2007

(30) Foreign Application Priority Data

Oct. 5, 2004    (EP) .................................. 04023702

(51) Int. Cl.
*B82B 1/00* (2006.01)
*C23C 18/12* (2006.01)

(52) U.S. Cl. ................. 416/241 R; 106/286.1; 106/286.4; 106/286.3
(58) Field of Classification Search .................. 106/286
See application file for complete search history.

(56) References Cited

U.S. PATENT DOCUMENTS

| 5,611,670 | A | 3/1997 | Yoshinari et al. |
| 6,024,792 | A | 2/2000 | Kurz et al. |
| 6,071,622 | A | 6/2000 | Beesabathina et al. |
| 6,368,394 | B1 * | 4/2002 | Hughes et al. ........... 106/14.12 |

(Continued)

FOREIGN PATENT DOCUMENTS

DE    199 29 616 A1    1/2001

(Continued)

OTHER PUBLICATIONS

Whikipedia.org/wiki/iron oxide.*

(Continued)

*Primary Examiner*—Melvin C Mayes
*Assistant Examiner*—Yun Qian

(57) ABSTRACT

The invention relates to a material composition that is used for producing a coating for a component, especially a turbine component, which is made of a metallic basic material, i.e. a metal or a metal alloy. Said material composition comprises a matrix material for forming a basic coating matrix and at least one filler for adjusting desired coating proportions or coating characteristics. The matrix material can be provided especially with basic glass ceramic properties. The inventive material composition is characterized in that the matrix material and/or the filler contains nanoparticles.

16 Claims, 3 Drawing Sheets

U.S. PATENT DOCUMENTS

| | | |
|---|---|---|
| 2002/0081397 A1 | 6/2002 | McGill et al. |
| 2003/0108459 A1 | 6/2003 | Wu et al. |
| 2003/0138660 A1 | 7/2003 | Darolia et al. |
| 2004/0180220 A1 | 9/2004 | Gueneau et al. |

FOREIGN PATENT DOCUMENTS

| | | | |
|---|---|---|---|
| EP | 0 142 418 B1 | | 5/1985 |
| EP | 0 412 397 B1 | | 2/1991 |
| EP | 0 486 489 B1 | | 5/1992 |
| EP | 0 786 017 B1 | | 7/1997 |
| EP | 0 892 090 A1 | | 1/1999 |
| EP | 0 905 279 A1 | | 3/1999 |
| EP | 0 933 446 B1 | | 8/1999 |
| EP | 0 995 816 A1 | | 4/2000 |
| EP | 1 096 040 A2 | | 5/2001 |
| EP | 1 204 776 B1 | | 5/2002 |
| EP | 1 209 321 A2 | | 5/2002 |
| EP | 1 306 454 A1 | | 5/2003 |
| EP | 1 319 729 A1 | | 6/2003 |
| WO | WO 96/06700 A2 | | 3/1996 |
| WO | WO 99/67435 A1 | | 12/1999 |
| WO | WO 00/44949 A1 | | 8/2000 |
| WO | WO 01/58625 A1 | | 8/2001 |
| WO | WO 2004/011688 A2 | | 2/2004 |
| WO | WO 2004/029326 A2 | | 4/2004 |
| WO | WO2004011688 | * | 5/2004 |
| WO | WO2005/056879 | * | 6/2005 |

OTHER PUBLICATIONS

Whikipedia.org/.*

* cited by examiner

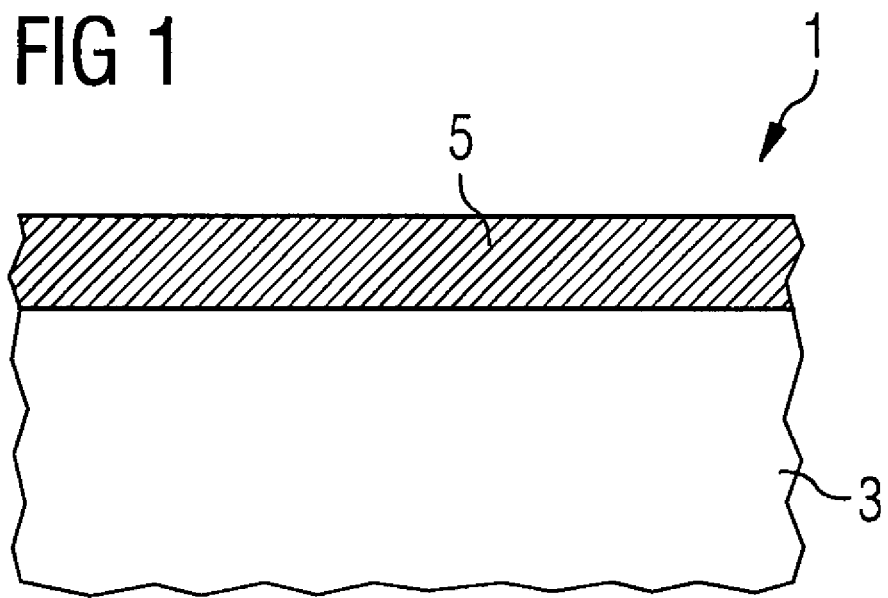
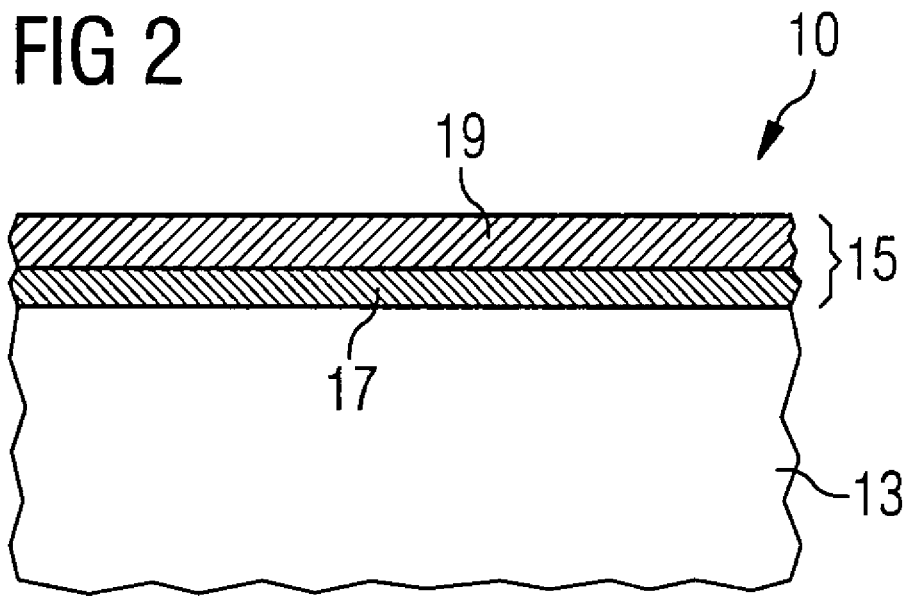

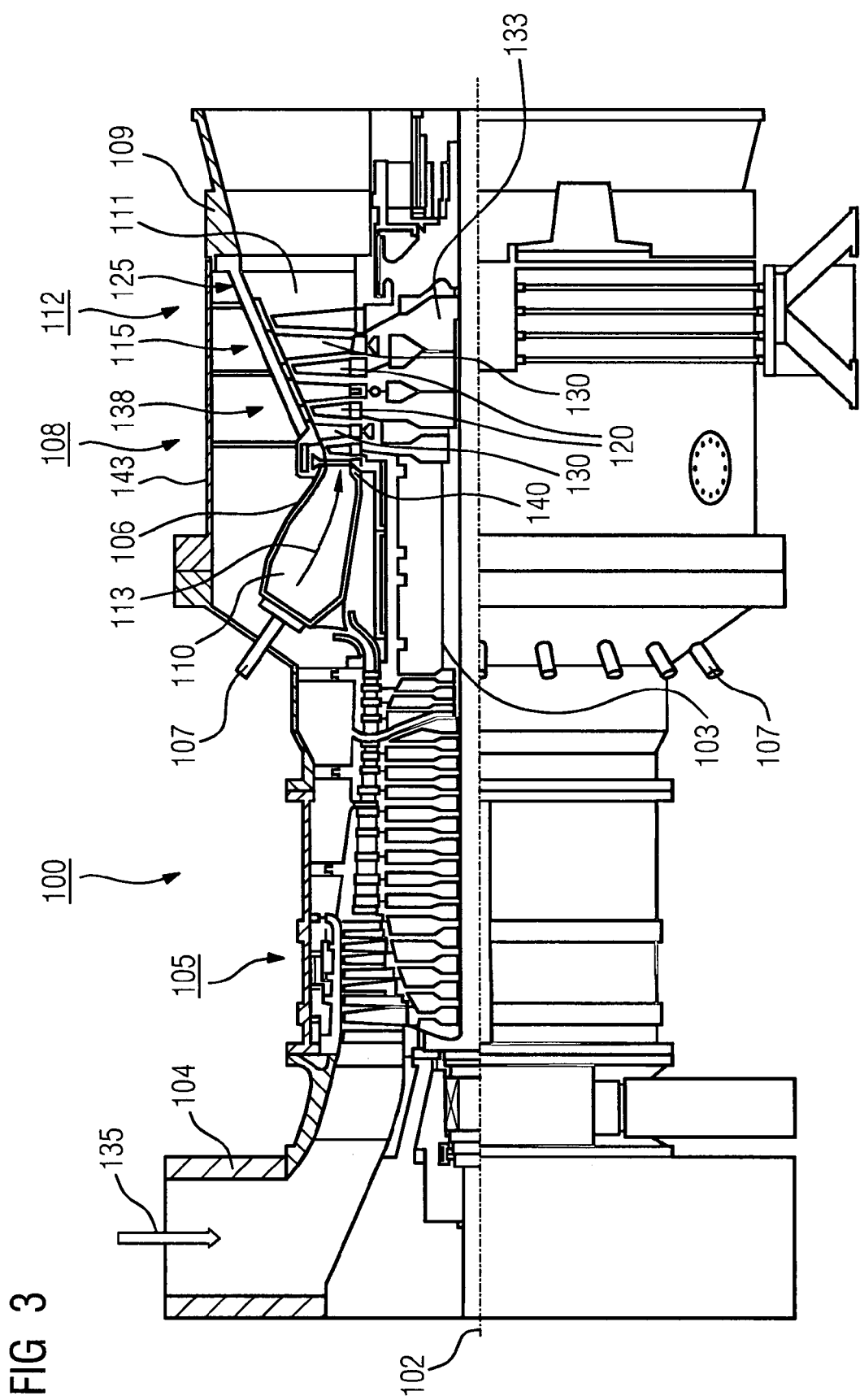

MATERIAL COMPOSITION FOR PRODUCING A COATING FOR A COMPONENT MADE FROM A METALLIC BASE MATERIAL, AND COATED METALLIC COMPONENT

CROSS REFERENCE TO RELATED APPLICATIONS

This application is the U.S. National Stage of International Application No. PCT/EP2005/054277, filed Aug. 31, 2005 and claims the benefit thereof. The International Application claims the benefits of European application No. 04023702.6 filed Oct. 5, 2004, both of the applications are incorporated by reference herein in their entirety.

FIELD OF INVENTION

The present invention relates to a material composition for producing a coating for a component, in particular for a component of a gas turbine installation, such as for example a compressor blade or vane, which is made from a metallic base material. The present invention also comprises a coated metallic component. The invention is suitable, for example, for use in gas turbine installations, in particular for use in compressors of gas turbine installations.

BACKGROUND OF THE INVENTION

In its simplest form, a gas turbine installation comprises a compressor, a combustion chamber and a turbine. Intake air is compressed in the compressor, and fuel is then added to it. This is followed by combustion of this mixture in the combustion chamber, with the combustion exhaust gases being fed to the turbine, where their thermal energy is withdrawn and converted into mechanical energy. The compressor is generally driven by the turbine and comprises a multiplicity of compressor blades or vanes.

During compression of the air in the compressor, water may be formed, which under certain circumstances combines with other elements contained in the air to form an electrolyte which can lead to corrosion and erosion at the compressor blades or vanes. To prevent this corrosion and/or erosion, therefore, compressor blades or vanes are generally provided with coatings. Coatings which are particularly suitable in this context are those which comprise a for example phosphate-bonded base matrix with metal particles, such as for example aluminum particles, dispersibly distributed therein. The protective effect of a coating of this type is that the metal particles embedded in the base coating, together with the (more noble) metal of the compressor blade or vane and the electrolyte, from a galvanic cell, in which the metal particles form what are known as sacrificial anodes. The oxidation or corrosion then takes place in the sacrificial anodes, i.e. in the metal particles, and not in the metal of the compressor blade or vane.

The phosphate-bonded base matrix has glass-ceramic properties, is thermally stable, is likewise resistant to the corrosion, and also provides protection against mechanical effects, such as abrasion and erosion.

In addition to the metal particles, the coating may contain further particles as fillers. By way of example, mention may be made at this point of dye particles.

Other types of coatings may be considered as well as phosphate-bonded coatings. EP 0 142 418 B1, EP 0 905 279 A1 and EP 0 995 816 A1 describe chromate/phosphate-based coatings. EP 1 096 040 A2 describes a phosphate/borate-based coating, and EP 0 933 446 B1 describes a phosphate/permanganate-based coating. The coatings described use particle additions with particle sizes of >1 µm. Therefore, the coatings have layer structures with grain sizes of over 1 µm. To obtain a smooth blade or vane outer surface, therefore, a particularly suitable outer coating, known as the top coat, is applied above a primer layer, known as the base coat, of this type.

SUMMARY OF INVENTION

It is an object of the present invention to provide a material composition which is advantageous compared to the prior art for the production of a coating of a component made from a metallic base material, in particular a turbine component, more particularly a compressor blade or vane or a turbine blade or vane.

A further object of the present invention is to provide an advantageous coated metallic component, in particular a turbine component, and more particularly a compressor blade or vane or turbine blade or vane.

The first object is achieved by the process as claimed in the claims, and the second object is achieved by the coated component as claimed in the claims. The dependent claims contain advantageous configurations of the invention and can be combined with one another in any desired way.

A material composition according to the invention for the production of a coating for a component, in particular for a turbine component which is made from a metallic base material, i.e. from a metal or a metal alloy comprises a matrix material to form a base matrix of the coating, and at least one filler material for setting desired coating properties and/or coating features. The matrix material may in particular have glass-ceramic base properties. The material composition according to the invention is distinguished by the fact that the matrix material and/or the filler material comprise(s) nanoparticles with particle sizes of less than 1 µm. It is preferable for the particle sizes of the nanoparticles to be in the range from 50 µm to 200 µm.

The use of nanoparticles serves, inter alia, to set an ultrafine layer microstructure. It is in this way possible to improve properties which are dependent on grain size, for example fracture toughness, strength, resistance to thermal shocks, etc., of the layer microstructure. On account of their high surface energy, materials with a grain size in the nanometer range have an extremely high sintering activity. The high number of interfacial atoms and the short diffusion paths in the nanoparticles mean that sintering of the material composition is possible at a temperature which is approx. 20% to 40% lower than the melting temperature of the volume-forming material. This in turn is beneficial to the grain growth in the material.

Moreover, it has been found that nanostructured materials used to protect against corrosion are more resistant to corrosive media than the coarse-grained coatings of the prior art. The improved corrosion protection for metals is caused by the presence of a greater number of uniformly finely distributed defects in the passive film, which are located primarily at the grain boundaries. The ultrafine distribution of the defects prevents a high local accumulation of harmful anions (for example chloride, sulphate, etc.). As a result, a greater force is required for anion accumulation and subsequent acidification, with the result that a higher anodic potential is required for stable hole growth.

The material composition with nanoparticles also has other properties which differ greatly from those of coarse-grained material compositions, i.e. compositions with particle sizes of over 1 μm. For example, the typical hardness of metals with particle sizes of approx. 10 μm is higher by a factor of 2 to 7 than the same metal with particle sizes of approx. 1 μm. Moreover, the hard-soft phenomenon of nanostructured materials occurs: hard material becomes more ductile, soft material becomes harder. On account of this hard-soft phenomenon, the material composition according to the invention can produce coatings of reduced brittleness.

In one configuration of the invention, solid constituents of the matrix material are in the form of nanoparticles. Forming the solid constituents of the matrix material as nanoparticles increases the thermal stability, the corrosion resistance as well as the resistance to mechanical effects of a coating produced from the material composition. Moreover, the use of nanoparticles in the matrix material, in particular in conjunction with the use of nanoparticles in the filler material, allows the production of smoother coatings than with the coarse-grained material compositions of the prior art. There is then no longer any need for a top coat. The costs and time required to coat a component can be reduced as a result of elimination of the process steps for production of the top coat.

Suitable nanoparticles for the matrix material are in particular—although not exclusively—materials comprising aluminum (Al), chromium trioxide ($CrO_3$), magnesium oxide (MgO), aluminum oxide ($Al_2O_3$) and/or boric acid ($H_3BO_3$).

In a further configuration of the present invention, the filler material comprises metal or metal alloy particles as nanoparticles. As a function of the metallic base material, these particles can be selected in such a manner as to provide a sacrificial anode effect. In other words, the metal or metal alloy of the nanoparticles can be less noble than the metal or metal alloy of the metal base material.

Depending on the metallic base material, the metal or metal alloy particles may comprise at least one of the following metals: aluminum (Al), magnesium (Mg), Iron (Fe), nickel (Ni), cobalt (Co), titanium (Ti) and zinc (Zn). The metals listed are particularly suitable for the coating of blades or vanes which are made from iron-base, nickel-base or cobalt-base superalloy. Alloys of this type typically comprise chromium, titanium, tantalum, aluminum, tungsten and further elements with excellent resistance to high temperatures combined, at the same time, with a high strength. Iron-based base alloys are used in particular to produce compressor blades or vanes, whereas nickel-based or cobalt-based base alloys are used in particular to produce the turbine blades or vanes. An example of a gas turbine blade or vane produced from a superalloy is given in U.S. Pat. No. 5,611,670. Therefore, reference is explicitly made to the disclosure of said document with regard to the composition of possible superalloys for turbine blades or vanes.

Since, on account of their small size, the metal or metal alloy particles have a particularly high reactivity, it is advantageous for them to be deactivated. The deactivation can be realized, for example, by the metal or metal alloy particles comprising an oxide layer, a phosphate layer or a deactivation layer which is compatible with the matrix material and/or further fillers, for example chromate, borate, etc. The deactivation layer can be produced in situ during production of the nanoparticles. This may take place, for example, by controlled addition of precursor compounds or gases. The deactivation of metallic nanoparticles is described, for example, in U.S. 2003/0108459 A1 and in WO 01/58625 A1. Therefore, reference is made to the disclosure of these documents with regard to the deactivation of the metal or metal alloy particles.

In a further configuration of the present invention, the filler material comprises hard-material particles as nanoparticles. The hard-material particles may in particular comprise at least one of the following materials: diamond, silicon carbide (SiC), cubic boron nitride (BN), corundum, etc. The nanoscale hard-material particles can be used to increase the resistance of a coating produced using the material composition according to the invention to mechanical effects.

In yet another configuration of the present invention, the filler material comprises thermally stable particles as nanoparticles. Suitable thermally stable nanoparticles are in particular zirconium oxide ($ZrO_2$), silicon oxide ($SiO_2$), aluminum oxide ($Al_2O_3$), aluminum-silicon oxide ($Al_xSi_y)O_z$, etc. The nanoscale thermally stable particles can be used to increase the ability of a coating produced using the material composition according to the invention to withstand thermal stresses.

Moreover, in a further configuration of the material composition according to the invention, the filler material may comprise dry lubricants as nanoparticles. Example of suitable dry lubricants include graphite, molybdenum sulfide $MoS_2$, tungsten sulfide $WS_2$, $ZrO_xN_y$, etc. The dry lubricants can be used to increase the ware resistance of a coating produced using the material composition according to the invention.

Finally, in yet another configuration of the material composition according to the invention, the filler material may comprise colored pigments of at least one pigment type as nanoparticles. The colored pigments can be used to realize a decorative or informative coloring of a coated component. Furthermore, the colored pigments can also contribute to improving the corrosion protection, the thermal stability and the ware resistance of the coated component.

The filler material may also comprise a mixture of various pigment types as nanoparticles, so that a large number of different colors can be realized.

A further aspect of the present invention provides a coated metallic component having a coating which has been produced from the material composition according to the invention.

In one particular configuration of the coated component, its coating has at least two layers, which contain different nanoscale pigment types. It is in this way possible, for example during maintenance or repair work carried out on the component, to use the color to recognize whether or not the top layer of the coating is present. This makes it possible to recognize to what extent the coating is still providing protection, and therefore obviates the need for unnecessary recoating.

The coated metallic component according to the invention may be configured, for example as a component of a turbine installation, in particular as a compressor blade or vane or as a turbine blade or vane.

BRIEF DESCRIPTION OF THE DRAWINGS

Further features, properties and advantages of the present invention will emerge from the following description of exemplary embodiments with reference to the accompanying figures, in which:

FIG. 1 shows an exert from a diagrammatic illustration of a coated compressor blade or vane.

FIG. 2 shows an exert from a diagrammatic illustration of a coated compressor blade or vane.

FIG. 3 shows a partial longitudinal section through an example of a gas turbine.

DETAILED DESCRIPTION OF INVENTION

Figure 4:
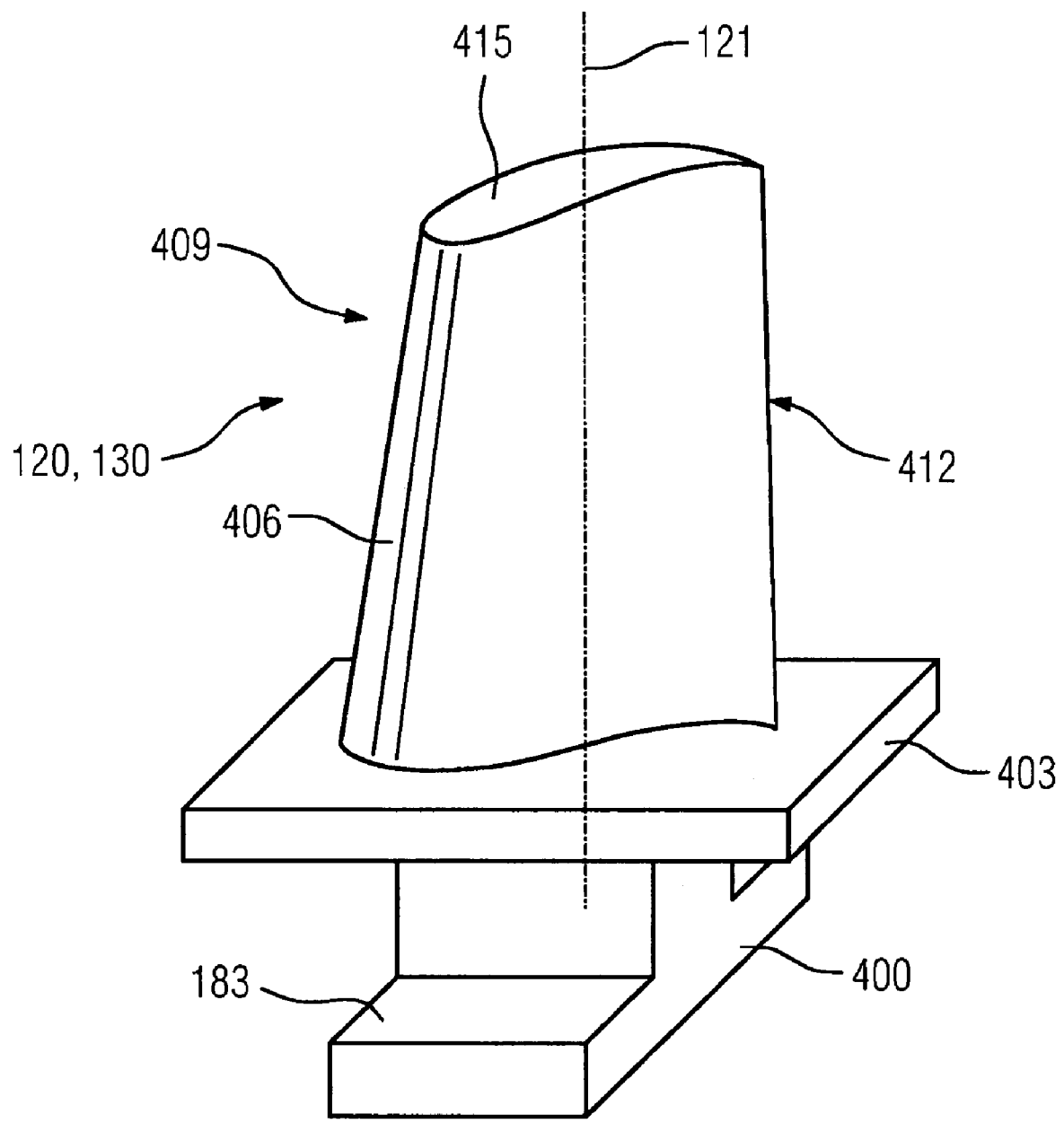
FIG. 4 shows a perspective view of a rotor blade or guide vane of a turbomachine.

FIG. 1 diagrammatically depicts an excerpt from a compressor blade or vane 1 as used in a compressor of a gas turbine installation. The base material 3 and a coating 5 applied to the base material 3 can be recognized.

The base material 3 of the compressor blade or vane 1 may be produced, for example, from a superalloy. Superalloys are alloys based on iron, nickel or cobalt, which typically comprise chromium, titanium, tantalum, aluminum, tungsten and further elements with an excellent resistance to high temperatures combined, at the same time, with a high strength. An example of a gas turbine blade or vane produced from a superalloy is disclosed, for example, in U.S. Pat. No. 5,611,670. Therefore, reference is made to said document with regard to the composition of suitable superalloys. In the present exemplary embodiment, the base material is an iron-based alloy.

The coating 5 is an inorganic coating to protect the compressor blade or vane 1 against corrosion and wear. It comprises an inorganic binder made from chromate/phosphate compounds and metal particles, for example spheroid aluminum particles, dispersively distributed in the binder, as a pigment.

The coating can be effected, for example, by spraying on the following material composition: 7% by weight chromium trioxide ($CrO_3$), 25% by weight phosphoric acid ($H_3PO_4$), 6% by weight magnesium oxide (MgO) and 62% by weight water ($H_2O$) as binder and aluminum particles with a mean diameter in the range from 90 to 110 µm as pigment. The production of aluminum particles of this type is described, for example, in WO 01/58625 A1. Therefore, reference is made to the disclosure of said document with regard to the production of the nanoscale aluminum particles. The composition of the binder and of further suitable chromate/phosphate-based binders are described in EP 0 142 418 B1. Furthermore, further possible coating compositions based on chromate/phosphate are described in EP 0 905 279 A1 and in EP 0 995 816 A1. Therefore, reference is made to said documents with regard to the chemical composition of chromate/phosphate-based coatings.

Unlike in the coating compositions mentioned therein, however, in the coating composition according to the invention described with reference to FIG. 1, the pigment is realized in the form of nanoscale particles. In the documents mentioned, by contrast, the diameters of the filler particles are in the µm-range.

The nanoscale metal particles or metal alloy particles added are used in particular as sacrificial anodes of the coating. Therefore, as a function of the composition of the base material, the metal should be selected in such a way that it is less noble than the base alloy, in order to ensure the sacrificial anode action. It is therefore preferable to use aluminum.

After the coating composition described has been sprayed onto the base material 3 of the compressor blade or vane 1, the composition is allowed to dry out, so that the binder then forms the layer matrix in which the nanoscale aluminum particles are embedded.

In a modification of the exemplary embodiment described, instead of the aluminum particles or in addition to the aluminum particles, it is also possible for the solid constituents of the binder, i.e. in the present exemplary embodiment for example the chromium trioxide and the magnesium oxide, to be in the form of nanoscale particles.

In general, the use of nanoscale particles serves to set an ultrafine layer microstructure. It is in this way possible to produce particularly smooth coatings, with the result that in the exemplary embodiment illustrated in FIG. 1 a top coat is not required.

As an alternative or in addition to the nanoscale pigments and/or aluminum particles, it is also possible for nanoscale hard-material particles, for example diamond, silicon carbide (SiC), etc. to be added to the coating described, in order to increase the resistance to mechanical effects, for example abrasion or erosion. It is also possible to add temperature-resistant nanoscale compounds, such as for example zirconium oxide ($ZrO_2$), silicon oxide ($SiO_2$), etc., in order to increase the ability of the coating to withstand thermal stresses. Finally, it is also possible to add nanoscale dry lubricants, for example graphite, molybdenum sulphide ($MoS_2$), etc., in order to set the coating wear resistance.

FIG. 2 shows an excerpt from a coated compressor blade or vane 10 as a second exemplary embodiment of the present invention. The figure illustrates the base material 13, which can be of the same structure as the base material 3 of the first exemplary embodiment, as well as a coating 15 applied to the base material 13. In the second exemplary embodiment, the coating comprises a first layer 17 and a second layer 19 applied above the first layer 17. The chemical composition of both the first layer 17 and the second layer 19 of the coating 15 corresponds to the coating 5 of the first exemplary embodiment.

Unlike in the coating 5 of the first exemplary embodiment, suitable colored pigments in the form of nanoscale colored pigment particles have additionally been added to the coating 15 of the second exemplary embodiment. Colored pigments are described, for example, in EP 0 905 279 A1, or are known as "color index" pigments (The Society of Dyers and Colorists). The desired coloring of the coating which is to be achieved through the addition of the colored pigments can be achieved by mixing various types of colored pigments. Unlike the known colored pigments, the colored pigments in the material composition according to the invention are added in the form of nanoscale particles.

In the present exemplary embodiment, a different type of colored pigment is added to the first layer 17 of the coating 5 from the type of colored pigment added to the second layer 19. It is in this way possible, when inspecting a blade or vane which has already been in operation, to use the color to ascertain the extent to which the coating has worn away. As soon as the second layer 19 has worn away, the color of the coating changes. It is in this way possible to demonstrate the need to refurbish the compressor blade or vane. Of course, it is also possible to use more than two differently colored layers.

The coating compositions described thus far have contained chromate/phosphate-based binders. However, alternative coating compositions may also comprise binders based on phosphate/borate or phosphate/permanganate.

By way of example, a suitable phosphate/borate-based binder may include the following constituents: water, phosphoric acid, boron oxide, zinc oxide and aluminum hydroxide. In a binder of this type too, the solid constituents may be in the form of nanoscale particles. It is in turn possible for nanoparticles, for example aluminum particles or other metal particles with nanoscale dimensions, i.e. with dimensions of less than 75 nm, preferably between 50 nm and 75 nm or preferably between 20 nm and 75 nm, in particular between 20 nm and 50 nm, to be added to the binder. As an alternative or in addition, it is possible for the nanoscale hard-material particles which have already been mentioned above and/or the abovementioned temperature-resistant particles and/or the abovementioned dry lubricants and/or the abovementioned nanoscale colored pigments to be added. Suitable compositions of phosphate/borate-based binders are described, for example, in EP 1 096 040 A2. Therefore, reference is made to the disclosure of said document with regard to the composition of possible binders for the coating composition according to the invention.

A suitable phosphate/permanganate-based binder may, for example, comprise the following constituents: 67% by weight water, 2% by weight magnesium permanganate, 23% by weight of 85% strength phosphoric acid and 8% by weight aluminum hydroxide. As in the other coatings described, the solid constituents of the binder composition may be in the form of nanoscale particles. Moreover, all the additions which have been mentioned in connection with the other exemplary embodiments in the form of nanoscale particles can also be added. Other possible chemical compositions for coatings based on phosphate/permanganate are described in EP 0 933 446 B1. Therefore, reference is made to the disclosure of said document with regard to suitable chemical compositions of possible binders for the coating composition according to the invention.

In the exemplary embodiments, the solids of the binders are in the form of nanoscale particles. However, it is also possible for the solids of the binder not to be in the form of nanoscale particles. In this case, one or more of the above-mentioned additives are present, with at least one of the additives being in the form of nanoscale particles.

FIG. 3 shows, by way of example, a partial longitudinal section through a gas turbine 100. In the interior, the gas turbine 100 has a rotor 103 which is mounted such that it can rotate about an axis of rotation 102 and is also referred to as the turbine rotor. An intake housing 104, a compressor 105, a, for example, toroidal combustion chamber 110, in particular an annular combustion chamber 106, with a plurality of coaxially arranged burners 107, a turbine 108 and the exhaust-gas housing 109 follow one another along the rotor 103.

The annular combustion chamber 106 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 106, are subject to the highest thermal stresses.

To be able to withstand the temperatures which prevail there, they can be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110. Superalloys of this type are known, for example, from EP 1 204 776 B1, EP 1 306 454, EP 1 319 729 A1, WO 99/67435 or WO 00/44949; these documents form part of the disclosure.

The blades or vanes 120, 130 may also have coatings which protect against corrosion (MCrAlX; M is at least one element selected from the group consisting of iron (Fe), cobalt (Co), nickel (Ni), X is an active element and represents yttrium (Y) and/or silicon and/or at least one rare earth element or hafnium). Alloys of this type are known from EP 0 486 489 B1, EP 0 786 017 B1, EP 0 412 397 B1 or EP 1 306 454 A1, which are intended to form part of the present disclosure.

A thermal barrier coating, consisting for example of $ZrO_2$, $Y_2O_4$—$ZrO_2$, i.e. unstabilized, partially stabilized or completely stabilized by yttrium oxide and/or calcium oxide and/or magnesium oxide, may also be present on the MCrAlX. Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

FIG. 4 shows a perspective view of a rotor blade 120 or guide vane 130 of a turbomachine, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406. As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130. Superalloys of this type are known, for example, from EP 1 204 776 B1, EP 1 306 454, EP 1 319 729 A1, WO 99/67435 or WO 00/44949; these documents form part of the disclosure. The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses. Single-crystal workpieces of this type are produced, for example, by directional solidification from the melt. This involves casting processes in which the liquid metallic alloy solidifies to form the single-crystal structure, i.e. the single-crystal workpiece, or solidifies directionally. In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures). Processes of this type are known from U.S. Pat. No. 6,024,792 and EP 0 892 090 A1; these documents form part of the disclosure.

The blades or vanes 120, 130 may likewise have layers protecting against corrosion or oxidation (MCrAlX; M is at least one element selected from the group consisting of iron (Fe), cobalt (Co), nickel (Ni), X is an active element and represents yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure.

It is also possible for a thermal barrier coating, consisting for example of $ZrO_2$, $Y_2O_4$—$ZrO_2$, i.e. unstabilized, partially stabilized or completely stabilized by yttrium oxide and/or calcium oxide and/or magnesium oxide, to be present on the MCrAlX. Columnar grains are produced in the thermal barrier coating by means of suitable coating processes, such as for example electron beam physical vapor deposition (EB-PVD).

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

The invention claimed is:

1. A coated turbine component having a metallic base material, comprising:
    a coating having:
        a matrix material comprising an inorganic binder forming a base matrix of the coating;
        a filler material comprising metal or metal alloy particles selected to be less noble than the base material to create a sacrificial anode action when in use in a turbine, wherein the matrix material or the filler material comprise nanoparticles with particle sizes of less than 75 nm in a quantity effective to produce a top surface having a degree of smoothness adequate for use in the turbine as a top surface of the component with no overlying top coating,
    wherein the coating comprises at least two layers across its depth, the layers containing different nanoscale pigment types to provide a color indication of wear.

2. The coated metallic component as claimed in claim 1, wherein the particle sizes of the nanoparticles are between 20 nm to 50 nm.

3. The coated metallic component as claimed in claim 2, wherein solid constituents of the matrix material are in the form of nanoparticles.

4. The coated metallic component as claimed in claim 3, wherein the nanoparticles comprise at least one of the following materials: Al, $CrO_3$, MgO, $Al_2O_3$, and $H_3BO_3$.

5. The coated metallic component as claimed in claim 1, wherein the metal or metal alloy particles comprise at least one of the following metals: Al, Mg, Fe, Ni, Go, Ti, and Zn.

6. The coated metallic component as claimed in claim 1, wherein the metal or metal alloy particles are deactivated.

7. The coated metallic component as claimed in claim 6, wherein the metal or metal alloy particles, for the deactivation, comprises an oxide layer, a phosphate layer or a deactivation layer.

8. The coated metallic component as claimed in claim 7, wherein the filler material comprises hard-material particles as nanoparticles.

9. The coated metallic component as claimed in claim 8, wherein the hard-material particles comprise at least one of the following materials: diamond, silicon carbide, cubic boron nitride, and corundum.

10. The coated metallic component as claimed in claim 7, wherein the filler material comprises dry lubricants as nanoparticles.

11. The coated metallic component as claimed in claim 10, wherein the dry lubricants comprise at least one of the following materials: graphite, $MoS_2$, $WS_2$, and $ZrO_xN_y$.

12. The coated metallic component as claimed in claim 7, wherein the filler material comprises colored pigments of at least one pigment type as nanoparticles.

13. The coated metallic component as claimed in claim 12, wherein the filler material comprises a mixture of various pigment types as nanoparticles.

14. The coated metallic component as claimed in claim 7, the filler material comprises thermally stable particles as nanoparticles.

15. The coated metallic component as claimed in claim 14, wherein the thermally stable particles comprise at least one of the following materials: $ZrO_2$, $SiO_2$, $Al_2O_3$, and $(Al_xSi_y)O_z$.

16. The coated metallic component as claimed in claim 1, wherein the component is a compressor or turbine blade or vane.

* * * * *